March 15, 1932. C. HEUZE 1,849,925
SURFACING DEVICE FOR GLASS AND CERAMIC ARTICLES
Filed April 29, 1929 2 Sheets-Sheet 1
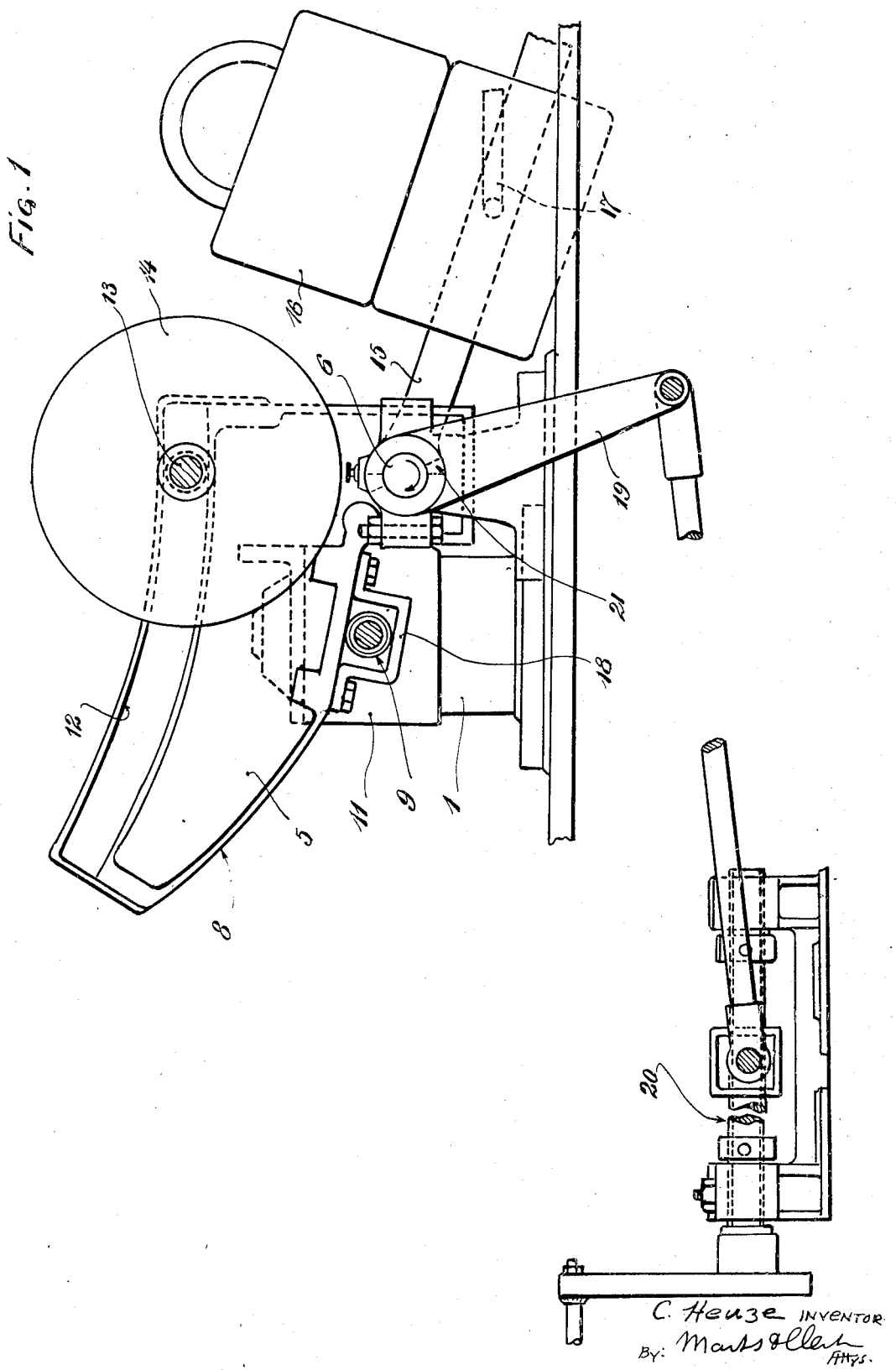

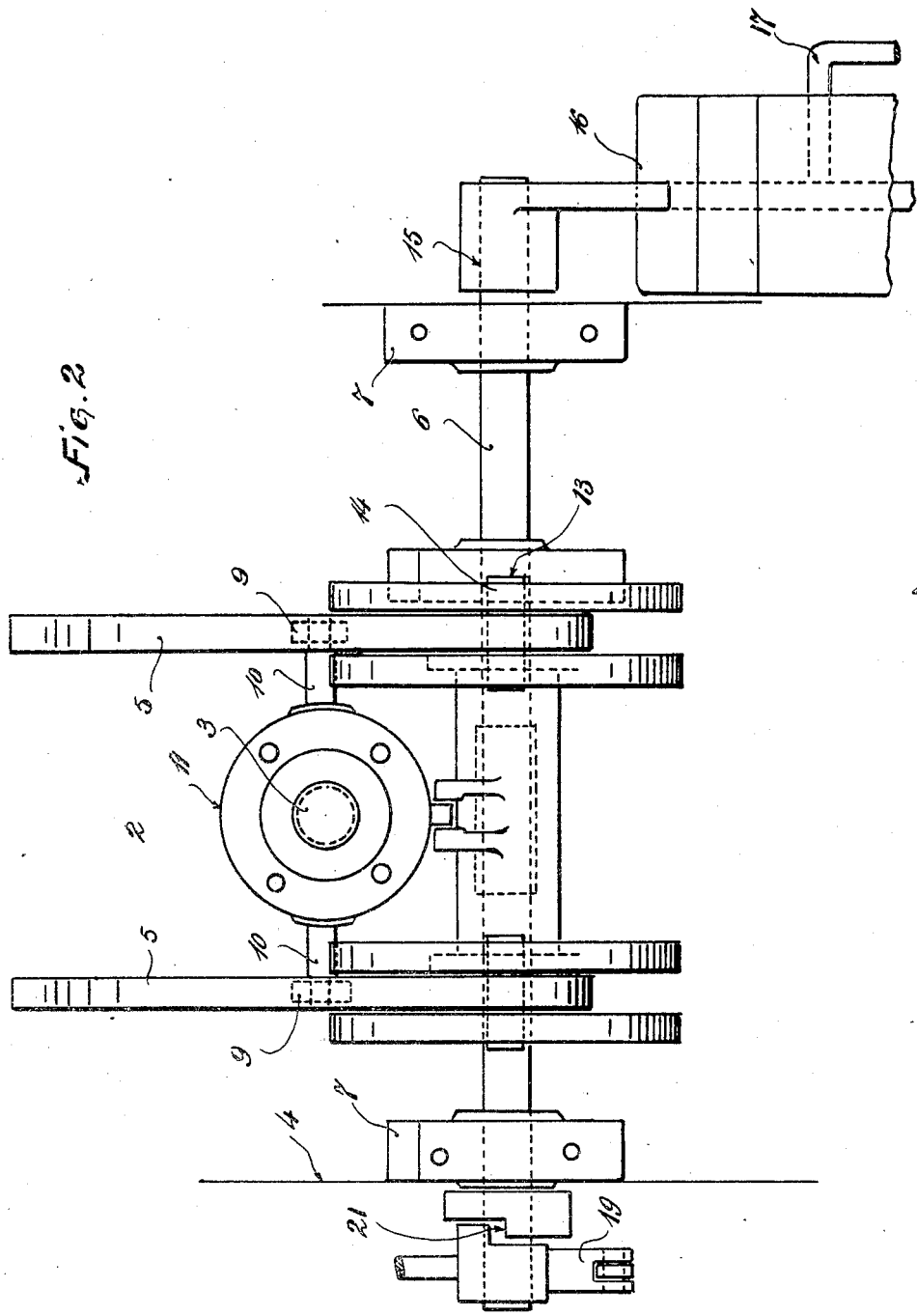

Patented Mar. 15, 1932

1,849,925

UNITED STATES PATENT OFFICE

CHARLES HEUZE, OF AUVELAIS, BELGIUM

SURFACING DEVICE FOR GLASS AND CERAMIC ARTICLES

Application filed April 29, 1929, Serial No. 359,018, and in Belgium February 13, 1929.

The invention has relation to devices comprising at least one rubbing tool or member, and more particularly to such devices in which the working pressure depends on the weight of such tool or members, as for example in grinding or polishing and more generally surfacing apparatus for glass or ceramic articles such as plate glass, marble and the like.

One object of the invention is to arrange these apparatus in such a manner that the working pressure may be maintained at a constant value, by automatic balance of the variation thereof caused by the wear of the rubbing tool or member, and that the initial pressure of such tool or member on the work may be adjusted as desired.

Another object of the invention is to arrange such a device as an unit enabling same to be moved away from its working position.

To this end the invention mainly consists in the combination with a rubbing tool or member, of a pressure member the action of which increases automatically with the wear of the tool or member.

In order to modify the action on the rubbing tool or member, the invention also consists to provide for an additional loading member of constant weight so arranged and connected that changes occur in its lever arm of action on the said rubbing tool or member in accordance of the wear of the latter.

The invention further consists in the combination with the pressure member of means adapted to balance to any desired degree the action of said pressure member on the rubbing tool or member so as to adjust the initial pressure of said tool or member on the article to be worked.

The invention further consists to combine as an unit, a rubbing tool or member, guiding and supporting means for said tool or member, a pressure member pivoted on the support and connected with the rubbing tool or member, as well as means enabling the pressure member and tool to be tilted in raised position relative to the support.

The invention will be better understood with reference to the annexed drawings illustrating by way of example the application thereof to a device or apparatus for grinding or polishing and more generally surfacing articles of glass or ceramic.

In these drawings:

Fig. 1 is a side elevation of a device comprising a rubbing tool embodying the invention;

Fig. 2 is a plan view thereof.

As above stated and as illustrated, the device comprises a rubbing tool 1 acting on the work 2, the tail 3 of the tool extending through a head 11 including the usual driving mechanism (not shown).

To compensate the loss of weight due to the wear of tool 1 during the operation thereof, I provide a pressure member formed, in the example illustrated, with two elements such as 5 pivoted with a shaft 6 in bearings 7 of the support 4 for the apparatus, and acting through their cam shaped lower edge 8 on rollers 9 supported on suitable trunnions 10 formed on the head 11 of the tool 1.

Each of the elements 5 is provided with a cam shaped split 12 and in each split is engaged a cylindrical shaft 13 supporting on each side a disc such as 14.

With a device so arranged, and assuming the tool 1 operating on the work 2, the wear of the tool causes progressive loss of its weight, while the head 11 supporting the trunnions 10 and the rollers 9 moves towards the work 2. Simultaneously the elements 5 are tilted in the same direction and the movable additional load—shafts 13 and discs 14—moves progressively in the splits 12 with automatic increases of the lever arm of action on the tool 1.

The shape of the splits 12 having been suitably selected taking into account the wear of the tool 1 and of the work 2, the increase of pressure due to the movement of the additional loads 13—14 will exactly balance the loss of weight of the tool 1 so that the resulting pressure on the work is of constant value.

And if it is desired to modify the initial pressure exerted by the tool 1 on the work 2, the adjustment of said initial pressure is readily obtained by securing on the shaft 6 a lever 15 charged with a counterweight 16, this latter being adjustable in position and secured in the adjusted position by means of the holding screw 17.

Additionally, if it is desired to move the tool 1 away from the work 2, members such as 18 are provided on the elements 5, such members surrounding the rollers 9 in such a manner that the shaft 6, being moved in the direction of the arrow (Fig. 1), for example by means of the lever 19, a towing device 20 and a suitable connection 21, the head 11 and the tool 1 are simultaneously raised and moved away from the work 2.

The various elements and parts having been suitably designed an apparatus with rubbing tool is provided in which the pressure of the tool 1 on the work 2 is maintained of constant value in an automatic manner in operation; in which the working pressure of the tool 1 may be adjusted at will, initially or in operation and in which the said tool may be moved towards or away from the work 2 as desired.

It will be understood that the invention is not limited to the embodiment particularly described and illustrated but includes the alternatives and the modifications thereof.

Claims:

1. An improved device or apparatus including rubbing tools or members, such as grinding or polishing and more generally surfacing apparatus for articles of glass or ceramic, comprising a pressure member and means adapted to increase the action of such member on the working tool in an automatic manner with the wear of such tool.

2. An improved grinding or polishing apparatus, in which the working pressure depends on the weight of the tool, comprising a pressure member, an additional load of constant weight and connecting means arranged so that the lever arm of action of the said additional load on the tool increases with the wear of such tool.

3. An improved grinding or polishing apparatus including a rubbing tool or member, a pivoted member, having a bearing connection with the rubbing tool or member and means to increase automatically the action of the pivoted member on the rubbing tool with the wear of said tool.

4. An improved grinding or polishing apparatus including a rubbing tool or member, a pressure member, an additional load, and means whereby the position of the additional load on the pressure member is automatically modified and the action of the pressure member on the tool is increased with the wear of the rubbing tool.

5. An improved grinding or polishing apparatus including a rubbing tool or member, a pressure member formed by means of at least one pivoted member, an additional load, and means whereby the position of the additional load on the pivoted member is automatically modified and the action of the pressure member on the tool is increased with the wear of the rubbing tool.

6. An improved grinding or polishing apparatus including a rubbing tool or member, an additional loading member and means whereby the position of such additional loading member is automatically modified relative to the axis of the rubbing tool and its action is increased on the tool with the wear of such tool.

7. An improved grinding or polishing apparatus including a rubbing tool or member, an additional load of constant weight and means whereby the position of the additional load is automatically modified relative to the axis of the tool and the action of the additional load on the rubbing tool is increased with the wear of such tool.

8. An improved grinding or polishing apparatus including a rubbing tool or member bearing on a surface to be ground, an additional load, connecting means between the rubbing tool and the additional load and means to increase automatically the action of the additional load on the rubbing tool in accordance with the downward movement of the same during the rubbing operation.

9. An improved grinding or polishing apparatus comprising a working tool the weight of which forms part of the pressure exerted on the work, a pressure member, such pressure member formed by means of at least one pivoted member, an additional load of constant weight connecting means between the additional load and the pivoted member, and said connecting means arranged so that the lever arm of action of the said additional load on the tool increases with the wear of such tool.

10. An improved grinding or polishing apparatus comprising a working tool the weight of which forms part of the pressure exerted on the work, a pressure member, such pressure member formed by means of at least one pivoted member, an additional load of constant weight bearing on the pressure member bearing means on the pressure member and the bearing means on said last member arranged so that the lever arm of action of the said additional load on the tool increases with the wear of such tool.

11. An improved grinding or polishing apparatus comprising a working tool, the weight of which forms part of the pressure exerted on the work, a pressure member formed by means of at least one pivoted member, an additional load of constant weight bearing on the pressure member and adapted to move automatically thereon so as to increase its lever arm of action with the wear of the tool.

12. An improved grinding or polishing apparatus comprising a working tool the weight of which forms part of the pressure exerted on the work, at least one pivoted pressure member, a curved bearing surface on said pressure member, a seat on the rubbing tool and the pivoted pressure member bearing on said seat, guide means in the pressure member, an additional load in the form of a rolling member moving between said guide means, and said guide means arranged so that the additional load moves automatically thereon in accordance with the movement of the tool towards the work during the rubbing operation.

13. An improved grinding or polishing apparatus comprising a working tool the weight of which forms parts of the pressure exerted on the work, at least one pivoted pressure member, a curved bearing surface on said pressure member, a seat on the rubbing tool and the pivoted pressure member bearing on said seat, guide means in the pressure member, said guide means in the form of an elongated track, an additional load in the form of a rolling member moving on said track, and said track arranged so that the additional load moves automatically thereon in accordance with the movement of the tool towards the work during the rubbing operation.

14. An improved grinding or polishing apparatus comprising a working tool the weight of which forms part of the pressure exerted on the work, a support, a shaft mounted in said support, two elements pivoted on said shaft on either side of the tool, trunnions on the tool and the pivoted elements bearing on the said trunnions, movable weights, said weights formed by two discs connected through a rolling shaft, guide tracks in the pivoted elements and the movable weights moving on said tracks.

15. An improved grinding or polishing apparatus including a rubbing tool or member, an additional load the action of which varies automatically on the rubbing tool with the wear of such tool, connecting means between such tool and such load, said means adapted to press on the tool or to raise such tool away from the work and said means including a lever arm, and a movable weight adjustable in position on said lever.

16. An improved grinding or polishing apparatus comprising a working tool, a support, a shaft mounted in said support, two pivoted elements secured to said shaft on either side of the tool, trunnions on the tool, stirrup-like members associated with the pivoted elements and surrounding the trunnions on the tool, a lever secured to the shaft of the pivoted elements, and a towing device connected to said lever and adapted to move the pivoted elements whereby the tool is moved axially away from the work.

17. An improved grinding or polishing apparatus comprising a working tool, a support, a shaft mounted in said support, two pivoted elements secured to the shaft, an additional weight automatically movable along the pivoted elements, trunnions on the tool, stirrup-like members associated to the pivoted elements and surrounding the trunnions on the tool, a lever secured to the shaft, a movable weight adjustable in position on the lever, another lever secured to the shaft and a towing device connected to said lever and adapted to move the pivoted elements and the tool away from the work.

18. An improved grinding or polishing apparatus comprising a working tool, pressure means acting automatically on the tool in accordance with the wear of said tool and held to follow the movements of the tool to and from the work, means adapted to independently adjust the action of the pressure means on the tool, said means including a lever arm and a weight adjustable in position on said lever and a towing device acting independently from the adjusting means and adapted to move the tool away from the work.

In testimony whereof I affix my signature.
CHARLES HEUZE.